(12) United States Patent
Johansson et al.

(10) Patent No.: US 6,798,117 B2
(45) Date of Patent: Sep. 28, 2004

(54) FINE CONTROL OF ELECTROMECHANICAL MOTORS

(75) Inventors: Stefan Johansson, Uppsala (SE); Mats Bexell, Uppsala (SE); Anders Jansson, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 176 days.

(21) Appl. No.: 10/191,115

(22) Filed: Jul. 10, 2002

(65) Prior Publication Data

US 2004/0007944 A1 Jan. 15, 2004

(51) Int. Cl.[7] .............................................. H01L 41/08
(52) U.S. Cl. ................................................ 310/323.02
(58) Field of Search ....................... 310/323.02, 316.01, 310/316.03

(56) References Cited

U.S. PATENT DOCUMENTS

| | | | |
|---|---|---|---|
| 3,902,084 A | | 8/1975 | May, Jr. |
| 5,027,028 A | * | 6/1991 | Skipper ...................... 310/328 |
| 5,089,740 A | * | 2/1992 | Ono ........................... 310/328 |
| 5,237,236 A | * | 8/1993 | Culp .......................... 310/317 |
| 5,453,653 A | | 9/1995 | Zumeris |
| 5,709,802 A | * | 1/1998 | Furuhata et al. ................ 216/2 |
| 5,751,090 A | * | 5/1998 | Henderson .................. 310/328 |
| 5,939,816 A | | 8/1999 | Culp |
| 5,952,766 A | * | 9/1999 | Mukohjima et al. ... 310/323.04 |
| 6,066,911 A | * | 5/2000 | Lindemann et al. ... 310/323.02 |
| 6,184,609 B1 | | 2/2001 | Johansson et al. |
| 6,337,532 B1 | * | 1/2002 | Johansson et al. ..... 310/323.02 |
| 2001/0020809 A1 | | 9/2001 | Matsuo et al. |

FOREIGN PATENT DOCUMENTS

WO    WO 0215379    2/2002

* cited by examiner

*Primary Examiner*—Mark Budd
(74) *Attorney, Agent, or Firm*—Young & Thompson

(57) ABSTRACT

According to the present invention, electromechanical motors are driven in such a way that contact portions of driving elements (10) are moved along smooth trajectories. The velocity is varied, the average velocity being lower during the time when the element (10) is in contact with a moving object (22) than during the contact free time. Preferably, the main displacement velocity component is non-negligible when switching between sets of elements (10). When stopping the motor, the actuating sets of elements (10) are brought into a voltage-free condition, one set at a time. The contact portions of the elements (10) are lapped with such an accuracy, that the normal force applied between the moving object and the stator (2) is large enough to cause elastic deformations of the stator (2) that are in the same order of magnitude or larger than the accuracy of the lapping.

30 Claims, 11 Drawing Sheets

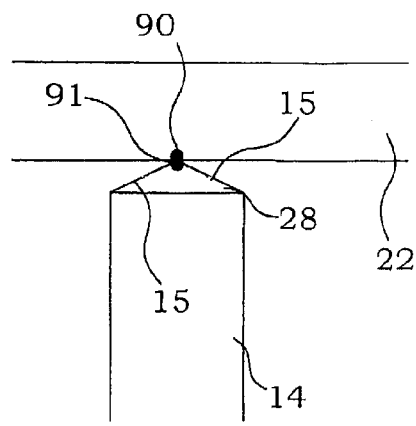
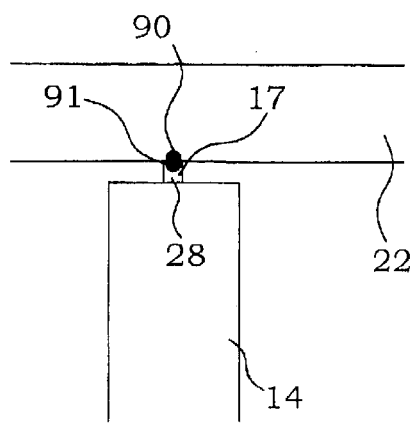
Fig. 11a　　　　　　　Fig. 11b
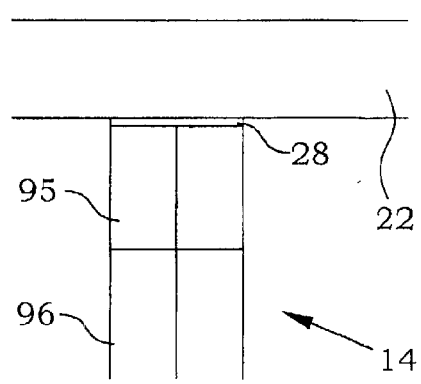
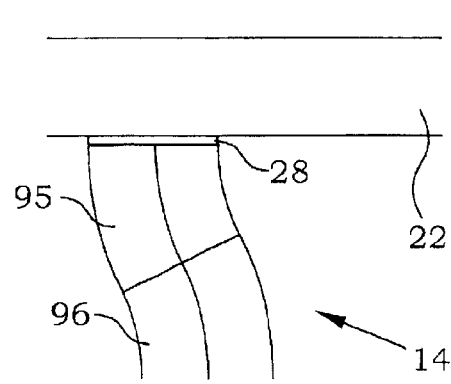
Fig. 12a　　　　　　　Fig. 12b

FINE CONTROL OF ELECTROMECHANICAL MOTORS

TECHNICAL FIELD

The present invention relates in general to control of electromechanical motors and in particular to such motors where the motion is based on repetition of small steps.

BACKGROUND

Small electromechanical motors, such as piezoelectric motors are commonly used in applications with need for extremely fine controlled positioning. Such applications often appear in e.g. portable consumer devices, laboratory equipment etc. There is often also an additional demand for low power consumption, low weight and price. The required motion is typically linear but often a rotating motor combined with a motion-converting mechanism such as a leadscrew is used. The motion range is often in the order of millimeters. There is yet no real miniature motors presented which fulfils all demands above.

Electromechanical motors may be constructed according to a number of different driving mechanisms. One approach makes use of phase shifted operation of different sets of actuators. In such a way, one set at a time can be brought into non-sliding mechanical contact with the object to be moved, while the other set is moved freely to a proper position for gripping the object. The object is thus moved forward by frequently repeating small steps at frequencies below resonance frequency. The motion is thus a non-dynamic or quasi-static motion. One typical mechanism for non-dynamic motion is the "inchworm" mechanism, first disclosed in the patent U.S. Pat. No. 3,902,084. The driven component is moved by mechanical steps in a clamp-extend-unclamp fashion, see e.g. in U.S. Pat. No. 5,751,090.

In the patent U.S. Pat. No. 6,184,609, a piezoelectric motor based on a non-dynamic driving mechanism is disclosed. The mechanism is an alternative to the "inch-worm" mechanism and could be denominated a "mechanical walking mechanism". The motor is made of an electromechanical material as a monolithic multilayer unit with at least two independent sets of drive elements that can move two-dimensionally. The motion of each set is characterized by the four sequences of gripping, moving, releasing and returning.

In U.S. Pat. No. 6,184,609, sinusoidal voltage signals are used to excite the drive elements, which results in an elliptical motion of the contact portions of the drive elements. The grip transfer between the different sets of drive elements occurs at essential zero velocity in the drive direction, which means that the entire object to be moved will be accelerated and decelerated within each step. Furthermore, the contact portions of the drive elements may be exposed to wear.

A general problem has been to find waveforms reducing noise and wear associated with velocity variations in the main displacement direction. Also vibrations in the normal direction of the moving object are much related to acoustic sound generation. Analysis and improvements of these properties have been disclosed in U.S. Pat. No. 6,337,532.

Due to different resonance phenomena in the stator and/or moving object, quasi-static motion is limited below certain frequencies. A typical design criterion for quasi-static motors according to prior art is to keep the frequency at least one order of magnitude below $f_r$, where $f_r$ is the lowest resonance frequency in the system. Increasing the frequency further will typically induce position accuracy problems, although the resonance frequency is not reached. The absolute velocity of the moving object is thus severely limited.

When stopping the electromechanical motor at a certain arbitrary position, the elements are in general exposed to a certain applied voltage, which now is constant. When maintaining these constant conditions, creeping phenomena may occur, which in turn may change the actual position of the moving object somewhat.

As a summary, general problems with prior-art electromechanical motors are e.g. accuracy problems, noise problems, wear problems, velocity problems and to a certain extent also efficiency problems.

SUMMARY

An object of the present invention is to provide improved methods, control devices and motors that reduce noise and wear. Another object of the present invention is to provide improved methods, control devices and motors with increased positioning accuracy, both dynamically and statically. Yet another object of the present invention is to provide motors that are possible to operate in a quasi-static manner at higher frequencies. Further objects of the present invention are also to improve power efficiency and to lower the production costs.

The above objects are achieved by methods, devices and motors according to the enclosed patent claims. In general words, the motors are driven such that the contact portions of the driving elements are moved along smooth trajectories. The velocity along the trajectories are varied in such a way that the average velocity is lower during the time when the element is in contact with the moving object than during the time when the element is free from contact. Preferably, the velocity component in the main displacement direction is non-negligible at the occasion when one set of elements grips the moving object and another releases the moving object. Voltage signals achieving such motions can preferably be selected as sinusoidal functions having an argument that is non-linear in time. It is further preferred to keep the main displacement velocity substantially constant during the time the element is in mechanical contact with the moving object.

When stopping the motor according to the present invention, the actuating sets of elements can be brought into a voltage-free condition, one set at a time, without change the position of the moving object in the main displacement direction.

The contact portions of the elements and the moving object are lapped with such an accuracy, that the normal force applied between the moving object and the stator is large enough to cause elastic deformations of the elements that are in the same order of magnitude or larger than the lapping accuracy. This allows for driving the motor at frequencies very close to the resonance frequencies of the motor, while maintaining the quasi-static motion.

Preferably, the contact portion of the drive elements is narrower in the main displacement direction than the drive element itself. Alternatively, the drive elements are formed by serially arranged bimorphs, to which voltages are applied in opposite manners, always giving a s-shaped stroke. The contact portions are advantageously provided with teeth structures.

BRIEF DESCRIPTION OF THE DRAWINGS

The invention, together with further objects and advantages thereof, may best be understood by making reference to the following description taken together with the accompanying drawings, in which:

FIGS. 11a–b schematically illustrate drive element geometries according to embodiments of the present invention;

FIGS. 12a–b schematically illustrate an embodiment of a double bimorph drive element according to the present invention;

DETAILED DESCRIPTION

Most actuator materials could be characterized as electromechanical materials, but in the present disclosure we intend materials that change their shape when an electric voltage or current is applied. Typical examples of electromechanical materials are piezoelectric, electrostrictive and antiferroelectric materials and these materials could be single crystalline as well as polycrystalline or amorphous.

Electromechanical motors and actuators, and in particular piezoelectric motors and actuators, are possible to classify according to their driving mechanism. In the present invention, electromechanical devices having a non-dynamic or pseudo-static driving mechanism are considered. A common property of non-dynamic mechanisms and pseudo-static mechanisms, is that controlled quasi-static walking can be achieved and in the following references are made to "walking mechanisms". A walking mechanism is thus characterized by at least two driving element sets that move an object sequentially by shape changes of the elements, utilizing direct contact between the element and the moving object, and where the set in contact with the moving object operates quasi-statically.

In the present invention, an electromechanical motor or actuator comprises at least two sets of actuator elements. Each set comprises at least one element. The elements are preferably bimorphous elements being able to position its contact point in two independent directions. Preferably, the elements are parts of a monolithic body, as in U.S. Pat. No. 6,184,609, but other solutions are also possible. First, the basic structure is described, then the manufacturing of such units will briefly be related, and finally the typical motion will be discussed more in detail.

Figure 1A:
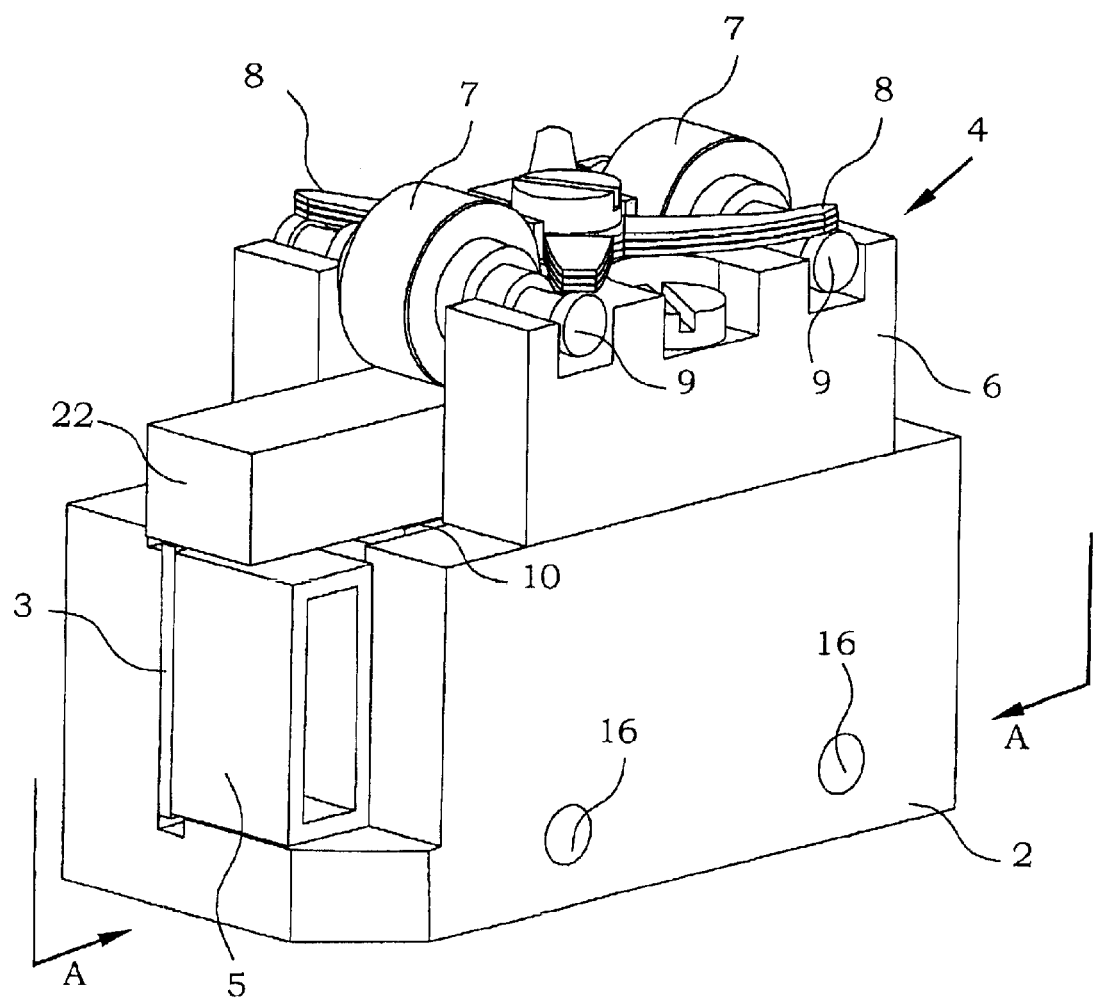
FIGS. 1a–c illustrate an embodiment of a motor according to the present invention.
Figure 1B:
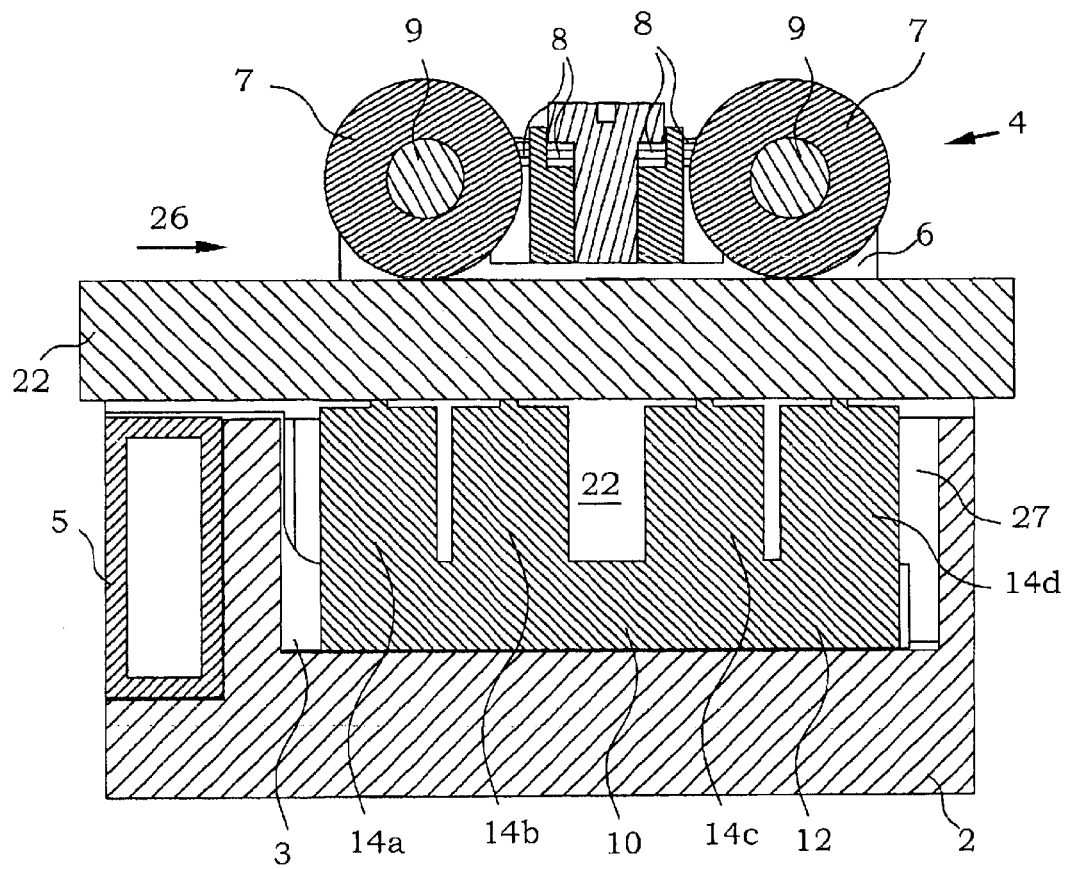
Figure 1C:
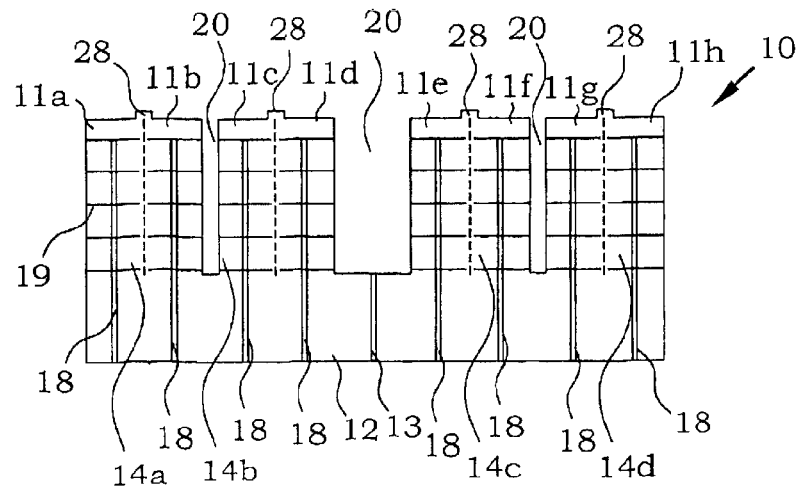

In one embodiment of a motor according to the present invention illustrated in FIGS. 1a–c, a piezoelectric motor comprises of the basic seven components: a monolithic drive unit 10 consisting of piezoelectric bimorph drive elements 14, a contacting portion 28 on top of the drive element 14, a housing 2 where the monolithic drive unit 10 is mounted, an electrical carrier 3, a connector 5, an object 22 to be moved and a spring unit 4.

A monolithic multilayer unit 10 is shown in detail in FIG. 1c. The unit 10 comprises a passive backing 12 and drive elements, in this case four drive elements 14a–d, separated by cuts 20. Each drive element 14a–d is divided into two separately controllable phase segments 11a–h. A number of phase electrode layers 19 and on the rear side earth electrode layers (not visible) are alternatingly incorporated within the drive elements 14a–d, and electrodes 18 contact the phase electrode layers 19 in the active areas in the drive elements 14. Each phase electrode 18 corresponds to one phase segment (11a–h). A similar earth electrode 13 is present in the middle connecting the earth electrode layers (not shown) on the rear side. This electrode layer 13 is used to make it possible to contact also the earth electrodes situated at the rear side from the "front" side of the unit 10. Since the earth electrode layer 13 is positioned vertically at the central cut, the manufacturing, as described below, is facilitated, since the number of masks can be limited. By applying a suitable voltage to selected electrodes in the connector 5, electrical fields will be applied within the drive elements and result in an expansion or contraction of the material between the phase electrode layers 19 and earth electrode layers. This will result in a bending and/or expansion/contraction of the drive elements 14a–d. How this drive element motion is translated to a motion of an object in contact with the unit 10 will be described more in detail below.

The unit is possible to manufacture by prior art techniques, e.g. wet building of piezoceramic slurry combined with screen printing of electrode paste, but other manufacturing techniques might as well be used. In brief, the fabrication could be described as follows; On a glass plate, layers of a slurry consisting of piezoceramic powder, a binder, a dispersant and a solvent is cast with e.g. a doctors blade. The slurry is allowed to dry by forced convection. Since the structure should be divided in a passive backing 12 and drive elements 14 the casting will be slightly different for these parts. The first layers will become the passive backing 12 and in the normal case there is no need for electrodes in this region so that another layer of slurry is cast on top of the previously cast and dried layer. The slurry is allowed to dry and the process is repeated until a sufficiently thick, typically about 1–3 mm passive backing is cast. In between the following layers, electrode patterns of e.g. Pt or AgPd paste will be screen-printed, using two different masks. One mask is used for the phase electrode layers 19 and another mask for the earth electrode layers and they will be used alternatingly. The casting is typically made over a surface of some square decimeters and the masks could be aligned by centering pins. After the casting is complete the whole green body is divided in units 10 using e.g. a dicing saw and at the same time the division of drive elements 14 are made by cuts 20 with the same depth as the desired length of a drive element 14. The unit 10 is heat treated, first at some 600–700° C. to remove the organic material and then at about 1000–1300° C. to sinter the material to a monolithic unit. After sintering, e.g. silver electrodes 13 and 18 are printed on both sides. The eight electrodes 18 make contact to the phase electrode layers 19 in the active areas in the drive elements 14. The electrode 13 makes contact to the earth electrodes. The earth side is not shown but is analogous to the phase electrode side except that all layers are connected. The drive elements operate as bimorphs and therefore there are two different active areas in each drive element 14, as indicated by a broken line. The silver paste is heat treated to form solid Ag electrodes on the sides of the unit 10.

The electrodes in each drive element normally extends to the exterior of the drive element at at least two sides. Therefore, to protect the drive unit from electrical discharges a suitable resin or some other type of conformal coating material is used.

Generally piezoelectric ceramics are easily worn in contact with hard materials. Therefore, to protect the piezoceramic material from wear, a contacting portion 28 of a wear resistant material, e.g. alumina, is assembled on top of the drive elements 14. Normally the drive surfaces 28 are glued but other type of assembly techniques are also possible such as soldering.

The electrical carrier 3 can be made of a flexible or hard material and is either soldered or glued with some electrical conductive resin to the monolithic drive unit 10.

For electrical connection to electronics an electrical connector 5 is soldered or glued to the electrical carrier 3. For certain motor designs the electrical connector 5 can be mounted directly onto the drive unit and thereby reducing the number of components in the motor.

The housing 2 is typically of a metal, e.g. steel or aluminium and can be made with standard fabrications techniques such as milling. The housing 2 has a cavity 27, where the drive unit 10 with its electrical carrier 3 and connector 5 is typically mounted with a suitable resin. Threaded holes 16 at the outside of the housing 2 are used to connect the motor to other mechanical building blocks. For protection of the drive unit 10, the cavity is filled with some suitable flexible material such as silicon rubber.

The spring unit 4 consists of a spring 8 screwed to a ball bearing holder 6, ball bearings 7 and sprints 9. The ball bearings 7 are pressed by the spring 8, via sprints 9 through the centre of the ball bearing 7, against the moving object 22 to apply a normal load between the moving object 22 and the drive unit 10. The spring 8 can be made in several ways and with several techniques. For ease of assembly and minimal number of components the spring 8 is preferably made in one piece by etching from large metal sheets.

The mechanism for moving an object by such a unit is of a non-dynamic type. For a description, references are made to FIG. 1*b*. We can consider the monolithic unit 10 in FIG. 1*b* as consisting of two sets of driving elements that operate independently. Let us choose drive element 14*a* and 14*c* as the driving elements of the first set. These drive elements 14*a*, 14*c* are thus working synchronously. These drive elements 14*a*, 14*c* are in contact with a moving object, in this case an object 22. Similarly, drive element 14*b* and 14*d* belongs to a second set. These drive elements 14*b*, 14*d* are thus also working synchronously. These drive elements 14*b*, 14*d* are not in contact with the object 22 in the illustration. The drive elements 14 are bimorphs with independently controllable voltages on the two sides of the bimorph. The top of the drive elements 14, the contacting portions 28, can therefore move arbitrarily within a certain area, if no load is present. For an ideal bimorph and for small strokes, this area constitutes a rhomb. For a certain phase-shifted motion of the two sets of drive elements, a motion of the moving object 22 according to the arrow 26 is possible to achieve. If repetitive voltage signals are applied on the drive elements, the contacting portions 28 will move along a certain trajectory within the admitted motion area.

In the remaining part of the present disclosure, "moving object" will refer to any body that is held against the drive elements in order to be moved relative to these drive elements. For applications, where a linear motion is requested, the "moving object" is preferably substantially flat in a macroscopic scale. However, for rotating applications, the "moving object" may be curved and even have a circular cross section.

In prior art, true quasi-static motion is considered to be present below frequencies of about 40% of a resonance frequency of the assembly of stator and moving object. Below, it will be shown that such a limitation to some extent is caused by height differences between different drive elements. For simplicity, the moving object is considered to be ideally flat compared with the height differences between drive elements. In practice, this is often the normal case.

To get controlled quasi-static stepping at reasonably high frequencies the moving object has to be in contact with the driving elements during all times. To not loose contact in the lifting direction (orthogonal to the contact surface and the main displacement direction), the kinetic energy of components such as the moving object should be less than the potential energy of the stator components and in particular the driving elements. This can be expressed as:

$$W_k \leq W_p$$

where $W_k$ is the kinetic energy and $W_p$ is the potential energy. If there is a total spring constant k of all driving elements in one set and a normal force N is applied in the lifting direction on the moving object, then the potential energy can be written:

$$W_p = \frac{N \Delta z}{2} = \frac{N^2}{2k}$$

where $\Delta z = N/k$ is the elastic compression in the lifting direction of the set of drive elements. This model neglects the remaining parts of the stator unit in the simplified calculation. However, the main principles will anyway be valid in most cases.

The kinetic energy will depend on the relative velocity difference in the lifting direction, $\Delta v$, and if we neglect energy losses during transfer between the drive element sets, the kinetic energy can be written:

$$W_k = \frac{1}{2} m (\Delta v)^2$$

with m being the equivalent mass of all the components that move in the lifting direction. The condition for controlled stepping can then be written:

$$m(\Delta v)^2 \leq \frac{N^2}{k}$$

It is here convenient to introduce the resonance frequency of the mass m connected to the drive element set:

$$f_r = \frac{1}{2\pi}\sqrt{\frac{k}{m}}$$

The condition will then be reformulated:

$$\Delta v \leq \frac{2\pi f_r N}{k}$$

There are two sources of large velocity differences; gripping impact and trajectory based movements. Both can be treated similarly. The most critical situation is typically when one drive element set will switch to the other set. During the time when one set is switching over to the other set, one element will move upwards with the velocity $v_z$ and the other set with another velocity that typically is $-v_z$ (for a reasonably symmetric movement trajectory of the drive element contact portions). The velocity difference $\Delta v$ will then be $2v_z$. With $\Delta t$ being the switching time, and $\Delta h$ being the height errors between the drive elements of the sets, the lifting velocity can be expressed:

$$\Delta v = 2v_z = 2\frac{\Delta z + \Delta h}{\Delta t}$$

Figure 2:
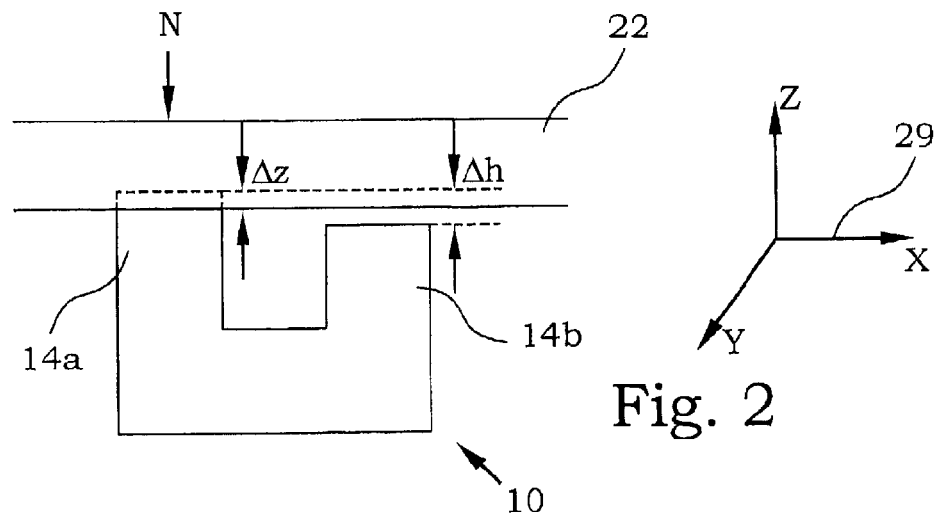
FIG. 2 is a schematic illustration of height errors and elastic deformation of drive elements.

The definitions of $\Delta z$ and $\Delta h$ are indicated in FIG. 2. In FIG. 2, the object 22, is held against the stator 10 by a force N. The drive elements 14a,b are in this figure provided with equal voltages, and in an ideal case, the length of the drive elements 14a,b should be the same. However, in practice a height difference $\Delta h$ always exists, which results in that drive element 14b is free from mechanical contact. The force N causes an elastic compression $\Delta z$ of drive element 14b. The condition for controlled motion can, using $\Delta z = N/k$, then be written as:

$$\frac{\pi f_r N}{k} \geq \frac{\Delta z + \Delta h}{\Delta t} = \frac{N}{k\Delta t} + \frac{\Delta h}{\Delta t}.$$

The switching time will always be a fraction b of the total stepping time T. The stepping frequency f can be related to the switching time using a parameter b:

$$f = \frac{1}{T} = \frac{b}{\Delta t}$$

and the condition above can be written:

$$f(\Delta z + \Delta h) \leq \pi b \Delta z f_r$$

In traditional piezoelectric motors, height errors are known to be very common problems. Normally, the compression $\Delta z$ due to elastic deformation is small in relation to $\Delta h$. A traditional piezoelectric motor would then be dimensioned according to:

$$f \leq \pi b \frac{\Delta z}{\Delta h} f_r << f_r.$$

If the drive element sets of a miniature motor instead are lapped very carefully, or a significantly higher normal force is applied, the height error will become smaller than the elastic deformation and the condition above can be approximated as:

$$f \leq \pi b f_r$$

The coefficient b times $\pi$ will typically be a fraction of unity and the condition above will be close to: $f < 0.4 f_r$. The operation interval can therefore be substantially increased if the elastic compression is adjusted to be similar or larger than height differences between contact portions.

In this simplified example only one vibration mode is discussed, and in general several modes should be considered. Tilting vibrations around the y-axis are of particular importance. For clarity, a local coordinate system 29 is incorporated in FIG. 2. The moment of inertia will then be included in the calculations and the size of the moving object in relation to distances between drive elements will enter the formulas. A large distance between actuator elements in combination with a short moving object increases tilting vibration frequencies. In general, the height errors, the elastic deformation, motor design and other parameters included have to be optimized to get as large operating frequency range as possible.

To get very high quasi-static operation frequencies, the mass m of the moving components should be reduced at the same time as the spring constant should be increased, with constant elastic deformation. The normal force in the lifting direction should therefore be increased giving a higher force capacity of the motor.

A higher spring constant is typically achieved by larger area of the drive elements and a shorter length. For instance if the electric field strength is doubled the drive elements can be shortened to half the previous length. This dimensioning would also be advantageous for driving larger masses. The corresponding driven mass $m_d$ is typically different and larger than the mass considered in the lifting direction. In many applications, a small portion of the object to be moved interacts directly with the drive elements. However, the whole mass of a driven unit in a given application might be needed to move in the main displacement direction. However, in the lifting direction, only the small portion might need to be moved by the drive elements. The spring constant in the driving direction, $k_x$, will also be different than the spring constant in the lifting direction. Even though the waveforms, discussed further below, are chosen to minimize velocity differences in the main displacement direction, there might be some minor variations connected to the step frequency. Such vibration in the main displacement direction can cause resonance phenomena connected with $m_d$ and $k_x$.

In general it is not easy to avoid this type of resonance and the step frequency is therefore chosen lower than:

$$f < 0.4 \frac{1}{2\pi}\sqrt{\frac{k_x}{m_d}}$$

The step frequency could therefore in some applications be very low, which of course is not desirable.

A possible solution in such a case is to decouple the resonance behavior of the main application mass and the motor. This may be implemented by use of a non-rigid connection between the portion interacting with the drive elements and the main application load. A spring and preferably also a damping component, such as silicone rubber, are preferably used in these cases.

Figure 3A:
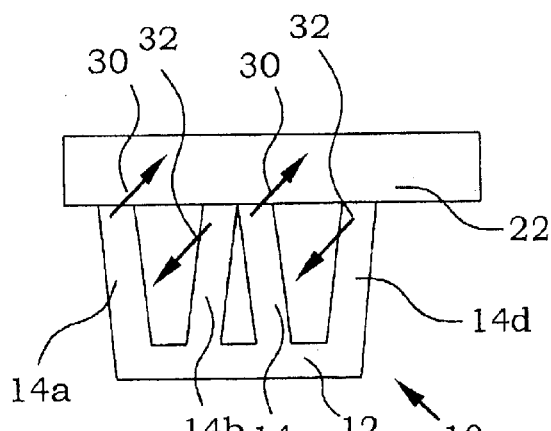
FIGS. 3a–d are schematic illustrations of a simple motion according to the present invention.

The motor according to the present invention is based on a walking mechanism. The basic features of the motion are illustrated in the FIGS. 3a to 3d. All motions of the drive elements are exaggerated enormously in these figures in order to visualize the mechanism, and for the same reason the actual shape and size of the drive elements are not in accordance with any preferred embodiments. In FIG. 3a, a situation when all drive elements 14 are in contact with the moving object 22 is illustrated. The elements of a first set, 14a and 14c, are bent to the left and the elements of a second set, 14b and 14d, are bent to the right. The elements of the first set are moved in the direction of the arrows 30, i.e. in an upper right direction. The elements of the second set are instead moved in the direction of the arrows 32, i.e. in a lower left direction. This means that the drive elements of the second set will loose its contact with the moving object 22, and the moving object 22 follows the motion of the contact portions of the drive elements of the first set.

Figure 3B:
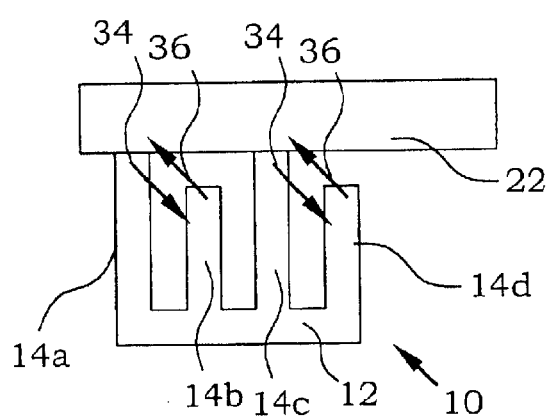

After some time, the situation in FIG. 3b is reached. The elements 14 have now changed their motion. The elements of the first set, 14a and 14c, now move in the direction of the arrows 34, i.e. in a lower right direction. The elements of the second set, 14b and 14d, instead move in the direction of the arrows 36, i.e. in an upper left direction. This means that the drive elements of the second set eventually will come into contact with the moving object 22 again.

Figure 3C:
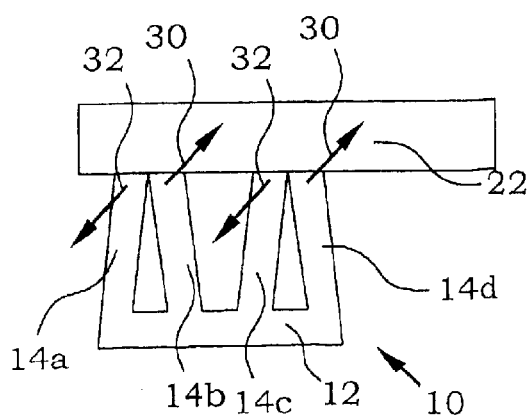

This situation is illustrated in FIG. 3c, i.e. all elements are again in contact with the moving object 22, but the second set at a slightly different position. From this situation, the elements of the second set, 14b and 14d, are moved in the direction of the arrows 30, i.e. in an upper right direction. The elements of the first set, 14a and 14c, are instead moved in the direction of the arrows 32, i.e. in a lower left direction. This means that the drive elements of the first set now will loose its contact with the moving object 22, and the object 22 follows the motion of the contact portions of the drive elements of the second set instead.

Figure 3D:
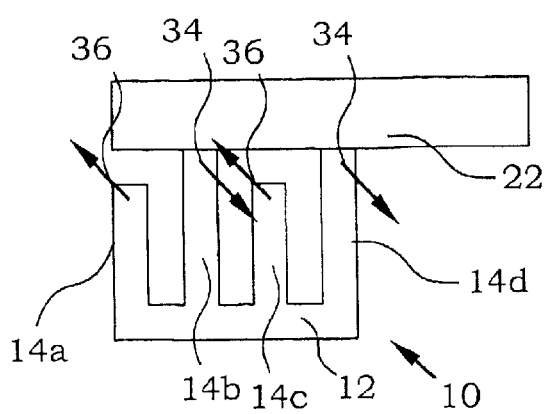

After some time, the situation in FIG. 3d is reached. The elements 14 have now changed their motion. The elements of the second set, 14b and 14d, are moved in the direction of the arrows 34, i.e. in a lower right direction. The elements of the first set, 14a and 14c, are instead moved in the direction of the arrows 36, i.e. in an upper left direction. This means that the drive elements of the second set eventually will come into contact with the object 22 again, and the cycle is repeated. The result will be a transportation of the moving object 22 to the right in the figure.

Four characteristic sequences of the motion are easily distinguished. At the situation in FIG. 3a, the drive elements of the first set are in their gripping sequence. The moving sequence takes place between the FIG. 3a over FIG. 3b and to FIG. 3c. At the situation in FIG. 3c, the drive elements of the first set are in their releasing sequence. Eventually, the returning sequence takes place between the FIG. 3c over FIG. 3d and to FIG. 3a. In theory, the gripping and releasing sequences could be almost indefinite short, but in reality, the gripping and releasing takes place during a certain time period.

In many systems according to prior art, phase shifted pure sinusoidal waveforms are used for controlling the drive elements. The deflection x and extension/contraction z of a drive element can be written as:

$$x(t)=k_1(u_1(t)-u_2(t)),$$

$$z(t)=k_2(u_1(t)+u_2(t)),$$

where $k_1$ and $k_2$ are constants depending on material, geometry etc. The two phase shifted sinusoidal waveforms used for controlling the drive element can be written as:

$$u_1=0.5u_{max}+0.5u_{max}\sin(\omega t),$$

$$u_2=0.5u_{max}+0.5u_{max}\sin(\omega t+\phi_s)$$

where $u_{max}$ is the maximum drive voltage, $\phi_s$ the phase shift between the applied voltages, $\omega$ the angular frequency, and t is time. The reason for having an offset in the drive voltage is to avoid negative voltages on the drive elements. If a negative voltage is applied to a poled piezoceramic material, there will be a risk for depoling of the material. It should, however, be noted that it might be possible to run piezoceramic materials with negative voltages if the proper material and drive conditions are used. Combining the equations above gives an expression showing that the element tip, i.e. the contacting portion of the drive element, will move along an elliptical trajectory:

$$x=x_0+a\cos(\omega t),$$

$$z=z_0+b\sin(\omega t)$$

where constants $x_0$ and $z_0$ depends on geometry, material etc. The constants a and b can be written as:

$$a=k_1'\sin(\phi_s/2),$$

$$b=k_2'\cos(\phi_s/2)$$

where $$k_1'=k_1 u_{max}$$

$$k_2'=k_2 u_{max}$$

Figure 4:
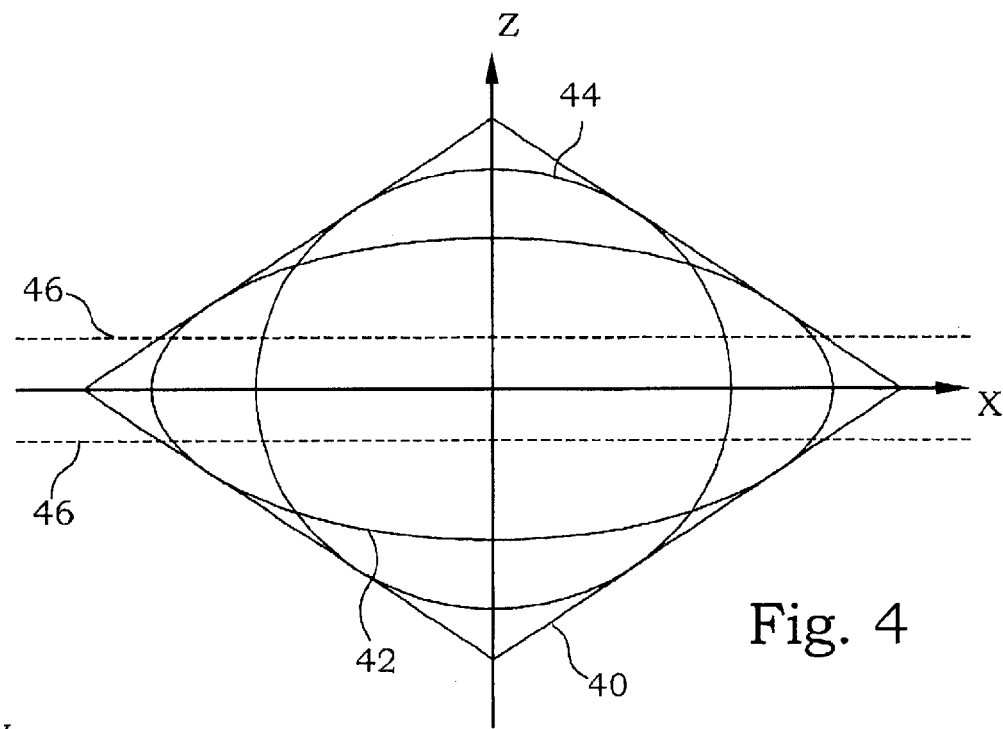
FIG. 4 is a diagram illustrating elliptical trajectories of a drive element.

Here it can be seen that the phase shift $\phi_s$ affects the geometry of the trajectory, in this case the size of the major and minor axis, respectively. In the extreme cases, where $\phi_s$ are 0 or $\pi$, the element will only move back and forth in the main displacement direction or up and down in the normal direction, respectively. The optimum phase shift depends on drive conditions, geometry and material for the element etc. and has to be adapted for each individual application. Elliptical trajectories 42, 44 are illustrated in FIG. 4.

A disadvantage with this type of waveform is that the main displacement velocity of the element depends on where the contact portion is in the trajectory. Furthermore, the grip transfer between the two sets of elements occurs where the main displacement velocity is zero or nearly zero. If there are any geometrical imperfections of the drive elements, the main displacement velocity may even be negative, i.e. the drive element has a motion backwards. A smooth grip transfer is therefore difficult to achieve. Moreover, the continuously changing velocity in the main displacement direction during a full step is often undesired.

In U.S. Pat. No. 6,337,532, the velocity variations in the tangential direction, i.e. in the main displacement direction of the moving object 22, are reduced by having a significant main direction velocity component during gripping and releasing sequences. Preferably, the tangential velocity component was kept constant during the entire gripping, moving and releasing sequences. The contacting portions of the drive elements were driven along a trajectory with the trajectory velocity adjusted so as to obtain an overlap between the gripping and releasing sequences and to maintain a constant velocity of the moving object during the whole drive cycle. Vibrations perpendicular to the main displacement direction was also addressed, and rather than the rhombic trajectory a trapezoid trajectory was preferred.

Certainly, a trajectory with sharp corners tends to change the motion of the drive element in an abrupt manner, similar to an external impulse force. Naturally this is particularly disadvantageous in the driving part of the trajectory, but could preferably be avoided in all parts of the drive cycle.

According to the present invention, a trajectory with a smooth shape is selected. The gradient in space coordinates along the trajectory is continuous, i.e. no edges or corners are present. In other words, the trajectories have continuous derivatives in space at all points. A mathematically simple trajectory, free from corners, is the elliptical trajectory, which advantageously is used in embodiments of the present invention.

The area in the x-z plane within which the contact portion of each drive element is free to move is restricted to a rhombic area 40. All trajectories are therefore limited to be within this rhombic area. Lines 46 illustrate an uncertainty range for the exchange z position between the two sets of drive elements. If one selects an elliptical trajectory that is narrow in the z-direction, see trajectory 42, FIG. 4, the available step length may be rather large, but so is the risk for significant negative velocities in the main displacement direction during gripping and releasing due to misalignment between the contact portions. Having a trajectory, which is broader in the z-direction, see trajectory 44, decreases the risk of negative tangential velocities during grip transfer, but will instead reduce the available step length. It should be pointed out that the ellipse may not be the optimal choice of trajectory equation for all drive conditions.

In sharp contrast to the prior usage of pure sinusoidal functions for the supplied voltages, the present invention introduces an enhanced control of the velocity along the displacement direction. According to the present invention, the average magnitude of the velocity component in the main displacement direction during gripping, driving and releasing the object is decreased, in comparison with the average magnitude of the velocity component during the returning sequence. In other words, this means that the contacting portions of the drive elements travel relatively slower when being in contact with the moving object and relatively faster when being free from contact. If two sets of equivalent drive elements are used, i.e. where each set of drive elements is in contact with the moving object for equal periods of time, and an elliptical trajectory is used, the drive elements spend more time in the upper half than in the lower. This will in turn result in that the parts where gripping and releasing occur, may be situated well above the horizontal symmetry line. In this area, there is always a non-zero velocity component in the main displacement direction. Moreover, even with small geometrical imperfections, the grip transfer points can always easily be kept in the upper half of the ellipse.

Figure 5:
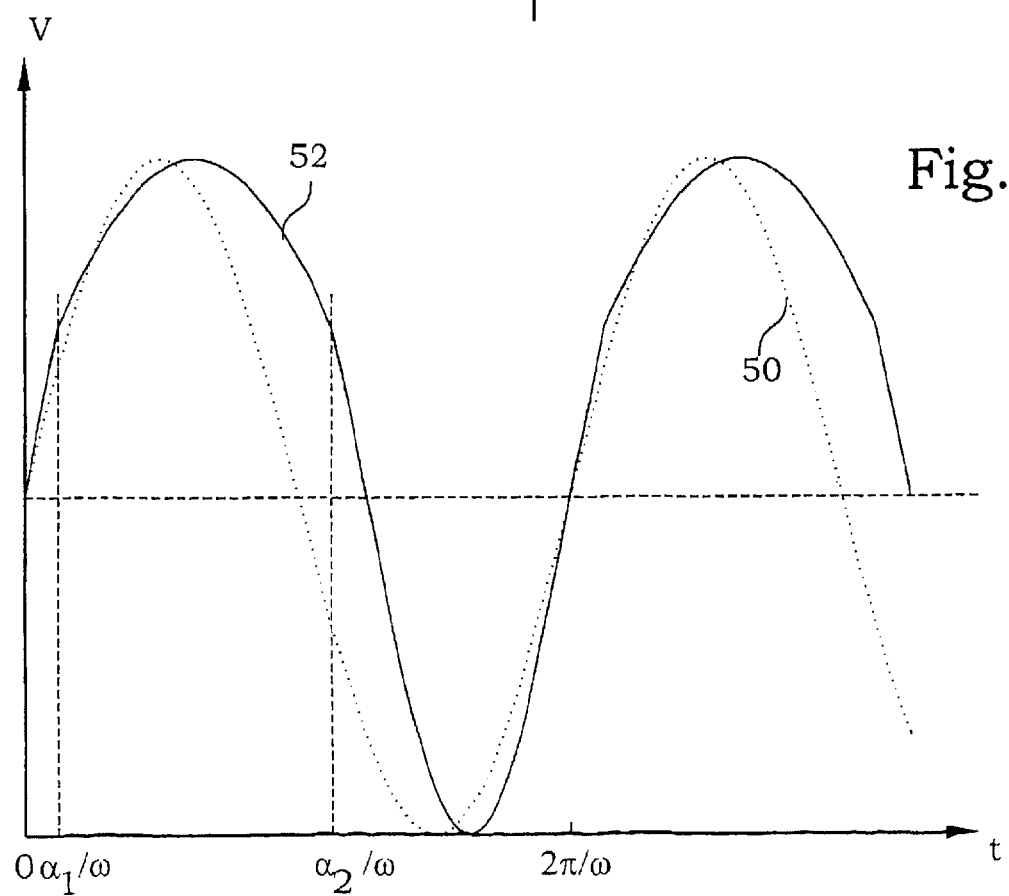
FIG. 5 is a diagram illustrating waveforms of voltage signals used in an embodiment of the present invention.

In a first embodiment according to the above ideas, a sine signal is used, but with different efficient angular velocities in different angle regions. Consider a constant $C_\alpha$, $0<C_\alpha<1$, controlling the angular velocity of the contacting portion of the drive element and $\alpha$ is the interval between $0<\alpha<\pi$ where $C_\alpha$ is used. At the other part of the drive cycle the velocity is instead increased a corresponding amount. Such a waveform gives a return portion of the drive cycle that has a higher velocity than the drive portion. Since the velocity of the drive portion is lower than the other parts of the drive cycle, the element that is to make contact with the moving object can gain velocity in the main displacement direction before making contact. In FIG. 5, a diagram illustrates a pure sinusoidal waveform 50 and a waveform according to the above principles 52. The waveform 52 exhibits a slowly varying form in the angle range $\alpha 1 - \alpha 2$, and assumes a more rapid varying form outside this range. At the connection points, there will be a sudden change in velocity. Preferably, this change occurs while the drive element still is freely moving, which avoids induced vibrations directly in the moving object. However, in a slightly more elaborate set-up, transition ranges may be introduced, where the velocity along the trajectory is varied smoothly between the two different angle ranges. It is also preferred that the transition from one drive element set to the other takes place in a region where the velocity is the same or as similar as possible for both pairs of drive element set. This reduces the risk for sliding and uncontrolled gripping during transfer.

The voltage signals may e.g. be described in a mathematical way by:

$$u_1 = 0.5 u_{max} + 0.5 u_{max} \sin(C\omega t + \phi),$$

$$u_2 = 0.5 u_{max} + 0.5 u_{max} \sin(C\omega t + \phi + \phi_s)$$

where $C=C_\beta$, $\phi=0$ for $0 \leq t < t_1$ $C=C_\alpha$, $\phi=\phi_\alpha$ for $t_1 \leq t < t_2$ $C=C_\beta$, $\phi=\phi_\beta$ for $t_2 \leq t < 2\pi$ and $\phi_s$ is the relative shift between the voltage signals, $$C_\beta = \frac{2\pi - (\alpha_2 - \alpha_1)}{2\pi C_\alpha - (\alpha_2 - \alpha_1)}$$

$$\varphi_\alpha = \alpha_1 (1 - C_\alpha) \left( \frac{1 + C_\alpha}{\alpha_2 - \alpha_1} - \frac{1}{2\pi} \right)$$

$$\varphi_\beta = (\alpha_2 - \alpha_1)(1 - 1/C_\alpha) \left( \frac{2\pi(1 + C_\alpha) - (\alpha_2 - \alpha_1)}{2\pi C_\alpha - (\alpha_2 - \alpha_1)} \right)$$

$$t_1 = \frac{\alpha_1}{C_\beta \omega}$$

$$t_2 = \frac{1}{\omega C_\alpha} \left( \alpha_2 - \alpha_1 \left( 1 - \frac{C_\alpha}{C_\beta} \right) \right).$$

$\alpha_1$ and $\alpha_2$ are the start and end phases, respectively, of the "slow part" of the trajectory, and correspond to $t_1$ and $t_2$, respectively. $\alpha_1$ and $\alpha_2$ are therefore predetermined angles between 0 and $\pi$. $C_\pi$ is the predetermined relative angular velocity during the "slow part". $C_\pi$ can not be chosen arbitrarily, but has to within the range $(\alpha_2 - \alpha_1)/2\pi$ to $(\alpha_2 - \alpha_1)/\pi$.

By choosing the drive portion e.g. to lie between $\pi/4 < \alpha < 3\pi/4$ the velocity variation in the main displacement direction during the drive portion will be reduced. However, at the same time, the average displacement velocity of the object to be moved is reduced to half. There is therefore a trade-off between a smooth motion of the object and the displacement velocity, with which it can be moved.

Another way of expressing a smooth transfer and reduced tangential velocity variations is to define a time dependent function $\alpha(t)$. Waveforms can then be expressed as:

$$u_1 = 0.5 u_{max} + 0.5 u_{max} \sin(\alpha(t))$$

$$u_2 = 0.5 u_{max} + 0.5 u_{max} \sin(\alpha(t) + \phi_s)$$

If for instance the angular velocity $(\omega(t) = \alpha'(t))$ is chosen to be a cosine function where the maximum velocity is at the lowest point of the elliptical trajectory and the lowest velocity at the highest point of the elliptical trajectory, the function α(t) becomes a sine function of the following form:

$$\alpha(t)=3\pi/2+2\pi ft(1+A\sin(2\pi ft)),$$

where A(0<A<1) is a constant corresponding to the amplitude of the angular velocity adjustment. By choosing a proper value of A, the main displacement velocity during the drive phase can be kept fairly constant. Also the transfer between drive element sets occurs on the upper part of the elliptical trajectory ensuring that the drive elements have gained velocity in the main displacement direction. By using continuous functions to the third derivative, the acceleration of the drive element is smooth, which in turn results in reduction of mechanical vibrations and acoustic emission.

Still, the main displacement velocity in the drive portion is mathematically not constant. Another approach can be used, based on piecewise approximations. First a particular trajectory is selected, which has a shape according to the general ideas presented further above. Ideally, the moving object should not have any movement in the lifting directions, but in case this is not possible to accomplish, a sinusoidal movement in the lifting direction is preferred. It is then possible to define the main displacement velocity to be constant during the driving phase as follows. The waveform corresponding to the driving part of the cycle can be considered as consisting of a finite number n of points. In a first embodiment, the time interval between them is always the same. Each point in the waveforms corresponds to a position in the trajectory equation T(x,z), i.e. n points ($x_n$, $z_n$). A drive part is defined, where the displacement velocity is held constant, i.e. $x_{i+1}-x_i=\Delta t \cdot v$, for any index within the drive portion, $i\epsilon[1,n-1]$. Each point $x_i$ in the trajectory can be calculated as $$x_i=x_1+k(i-1)$$

where k is a constant defined by the length of the drive interval and the number of points n in it. The constant k can be calculated as $$k = \frac{x_n - x_1}{n - 1}$$

When each point $x_i$ is calculated, the corresponding points $y_i$ is given by the chosen trajectory equation. One example of such a trajectory equation is the elliptical equation. The waveform is created so that the voltages corresponding to the different points are passed at regular time instances Δt.

Figure 6A:
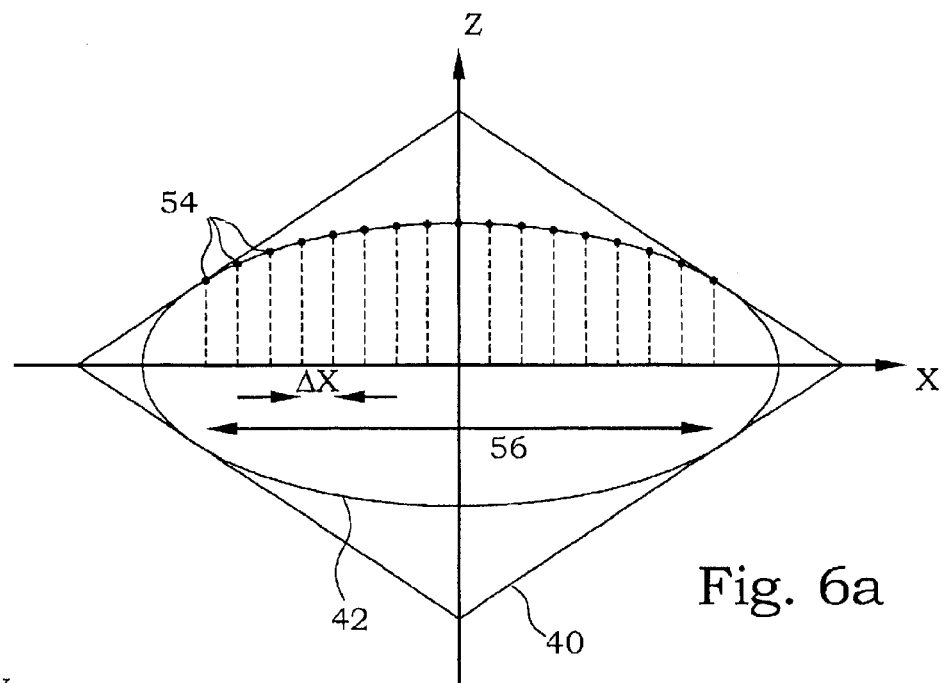
FIG. 6 is a diagram illustrating an elliptic trajectory divided by a number of points, which according to one embodiment of the present invention has to be passed at regular times.
Figure 6B:
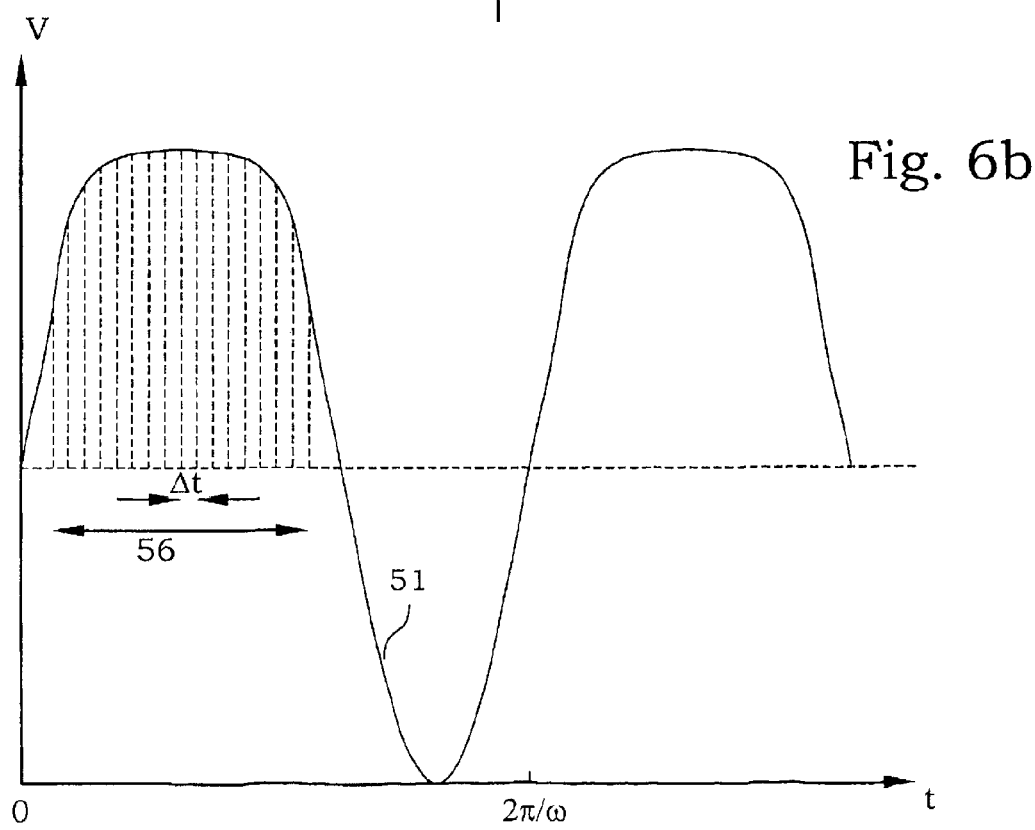
Figure 6C:
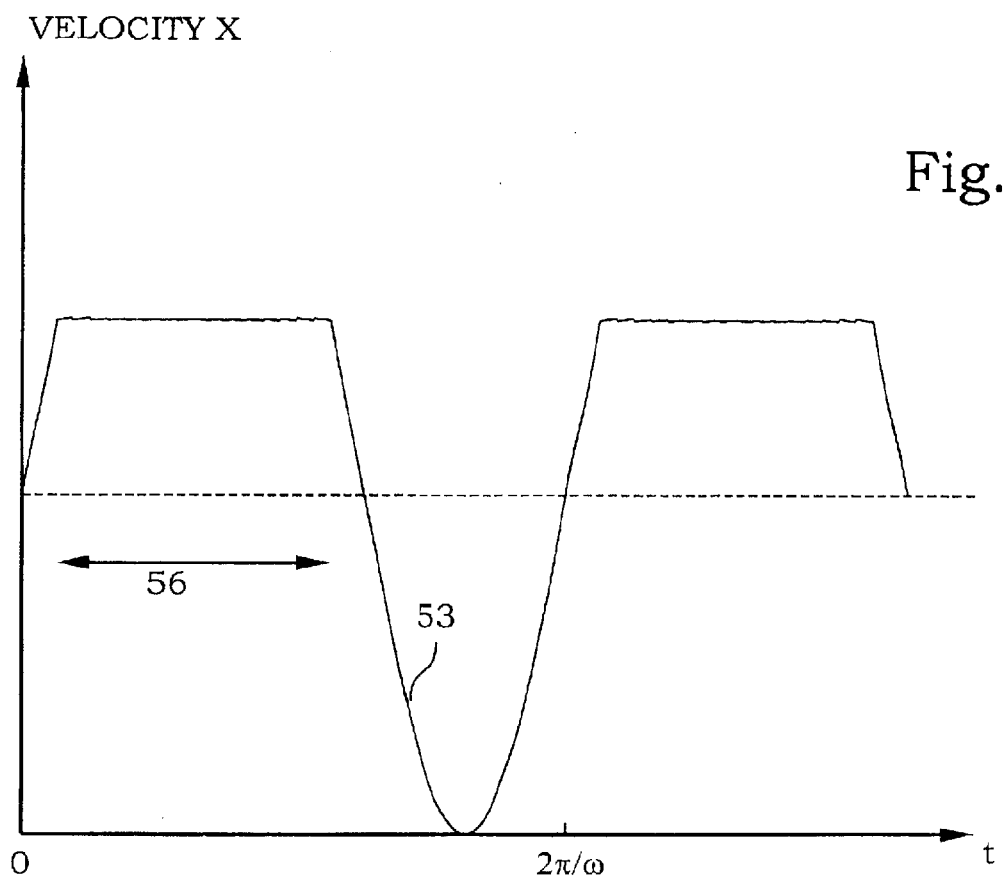

In FIG. 6a, these principles are illustrated schematically. An elliptical trajectory is here used, and a number of points 54 within a driving angle range 56 are defined to be evenly spread ΔX along the main displacement direction X. The voltage signals or waveforms, as shown in FIG. 6b, are adjusted in such a way that these points are passed at equal time intervals Δt. The velocity in the x-direction, i.e. the main displacement direction then varies as in FIG. 6c. Within the driving range 56, the velocity component in the x-direction is almost constant.

An alternative would be to let the time interval between the different points vary, which gives a set of trajectory points, having an associated time interval to the next trajectory point. In such a way, portions of the trajectory, where the main displacement velocity varies most, can be provided with more points than trajectory portions where the main displacement velocity varies very little.

All these concerns are related to the driving part of the trajectory. The adjustment of the angular velocity during the remaining part of the drive cycle should be made as smooth as possible and preferably have a shorter time of duration than the drive part. The overlap between the gripping and releasing sequences are given by the number of micro-step points within the driving portion of the drive cycle. Consider e.g. a total of 256 points in a full cycle, and a phase shift of 128 points for the two sets of drive elements, and that one set is at the bottom of the trajectory at micro-step 0 whereas the other set is at the top of the trajectory. If the number of micro-steps outside the defined drive portion of the cycle are comparably few, there will be significant overlap between the gripping and releasing sequences of the two sets.

Figure 7:
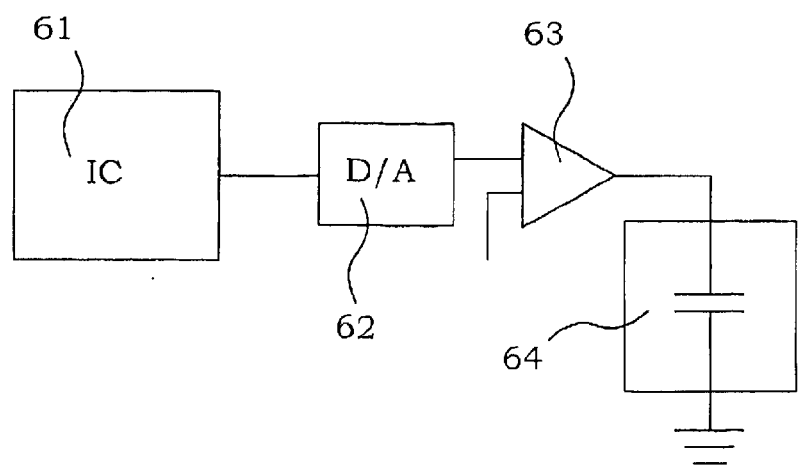
FIG. 7 illustrates an electronic drive device suitable for the present invention.

One embodiment of an amplifier circuit suitable for control purposes according to the above schemes is given in FIG. 7. A linear amplifier 63 drives a motor phase, illustrated as a capacitor 64. The linear amplifier 63 is in general a circuit in itself. Preferably, the amplifier 64 has a built-in or external low-pass filter to avoid resonance in the motor or other components. The linear amplifier is driven by a digital-to-analogue converter 62, which gets the digital definition of the voltage wave from a integrated circuit 61. The IC is preferably a programmable logic circuit such as a FPGA (Field Programmable Gate Array) to make it easier to optimize motors for each application. The choice of voltage control of the motors has several advantages, including stability and simplicity. One important advantage is that the circuit can be used to damp various unwanted motion modes since the motor phase can be considered connected in short-circuit at a given voltage. By proper choice of impedance of the amplifier, various undesired motion modes can be damped. The parallel architecture of a FPGA makes it easy to run complicated optimization sequences, where all phases has to be changed each cycle or even oftener. The economical circuits available today are able to drive a motor at a cycle frequency of 100 kHz with a cycle resolution of more than 256 micro-step points per whole cycle. This corresponds to a clock frequency of about 25.6 MHz. The voltage definition could be made much better, and will not limit the resolution of the motor. With a clock frequency of 500 MHz, which is available today for a slightly higher cost, the micro-step resolution will improve with a factor 20.

When stopping the electromechanical motor at a certain arbitrary position, the elements are in general exposed to a certain applied constant voltage. If such conditions are maintained, creeping phenomena may occur, which in turn may change the actual position of the elements and/or deteriorate the future performance. When parking the motor, the final situation should be selected in such a way that the effects of time-dependent processes are minimized. In U.S. Pat. No. 6,337,532, a method is presented, which brings the motor to a position where the drive elements are in symmetric antagonistic balance.

According to the present invention, an alternative method is proposed. This approach aims for finding a position of the drive elements where the voltages are completely turned off. Such a position should be reached without altering the position of the object to be moved.

Figure 8:
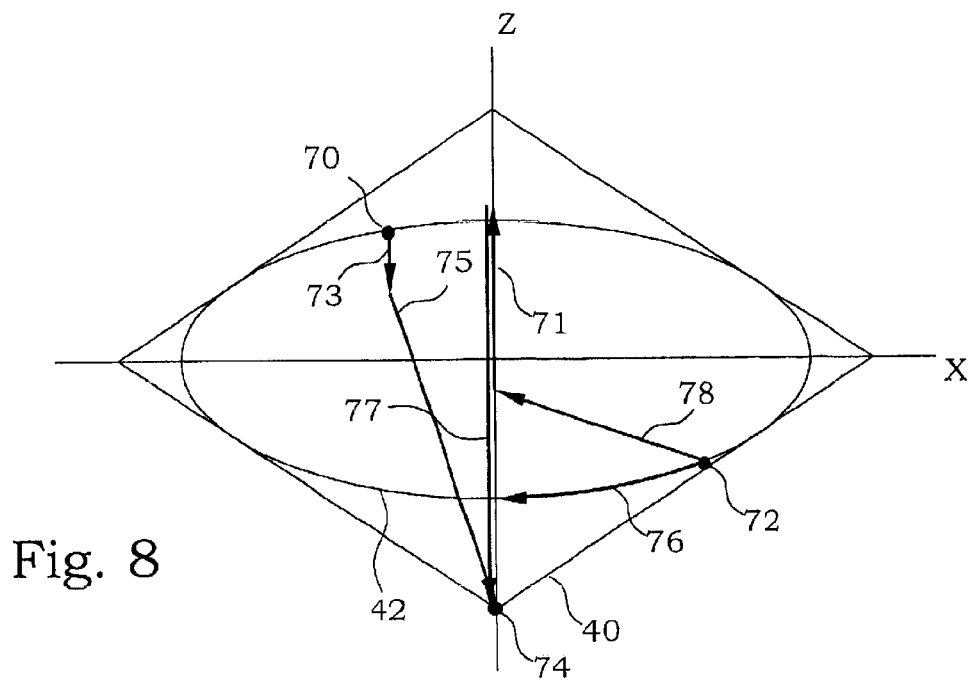
FIG. 8 is a diagram illustrating trajectories of a parking procedure according to one embodiment of the present invention.

FIG. 8 illustrates trajectories of drive elements, visualizing a typical procedure according to these principles. The trajectories used as examples are elliptical trajectories. However, the same principles are applicable to all trajectories presented in the present disclosure. The motor stops at a certain position. The first set of drive elements is presently in contact with the moving object. This is illustrated by the point 70 in the diagram. The second set is in the returning phase of the trajectory, illustrated by the point 72, and is presently not in contact with the moving object. This situation is therefore conserved when the motion is stopped. If the voltage of the drive elements is brought to zero, the drive elements will move into the bottom of the diagram, point 74. This is the preferred parking condition, but it has to be reached without change the position of the moving object along the main displacement direction. According to the preferred procedure, the second set of drive elements, i.e. the ones that presently are not in contact with the moving object, are moved to a position at or straight above the zero voltage position 74. This can be performed by continuing 76 along the normal motion trajectory or along any other path 78 that does not cause any contacting with the moving object. If both sets are involved in a gripping/releasing procedure, one of the sets is selected arbitrary to be moved first.

The second set of drive elements is subsequently moved straight upwards 71, i.e. along the z-axis in the diagram, until it comes into contact with the moving object. The first set is now instead free to be moved. The first set is first moved straight downwards along a vertical path 73 in the diagram, in order not to change the position in the main displacement direction of the moving object. When the first set of drive elements have left any mechanical contact with the moving object, it can be moved along any contact-free path 75 to the voltage-free position 74. Finally, the second set is moved straight downwards 77 until also the second set of drive elements are voltage-free.

The moving object is during such a parking procedure only moved in an essential up-down direction z, i.e. perpendicular to the main displacement direction x. The position of the moving object is therefore maintained.

The exact shape of the paths along which the sets of drive elements are moved should be as similar as possible for the two sets to prevent effects from e.g. time dependent creep with the limitation that they should not cause any interaction with the moving object. If there is any risk for contacting the moving object, all motions have to be performed substantially vertical (as defined in FIG. 8). The parking is in other words reached by moving the sets of drive elements, one at a time, to a voltage-free position, under the constraint that the motion is substantially vertical, i.e. perpendicular to the main displacement direction, when being in mechanical contact with the moving object.

Any creep, aging etc of the two set will now effectively be minimized. The controlled positioning of the element sets to approach voltage-free positions for stopping or holding is essential for fine positioning. To further reduce the movement at a voltage free position, the two sets of drive elements should approach the final position in antagonistic manner and at as similar path as possible.

Figure 9:
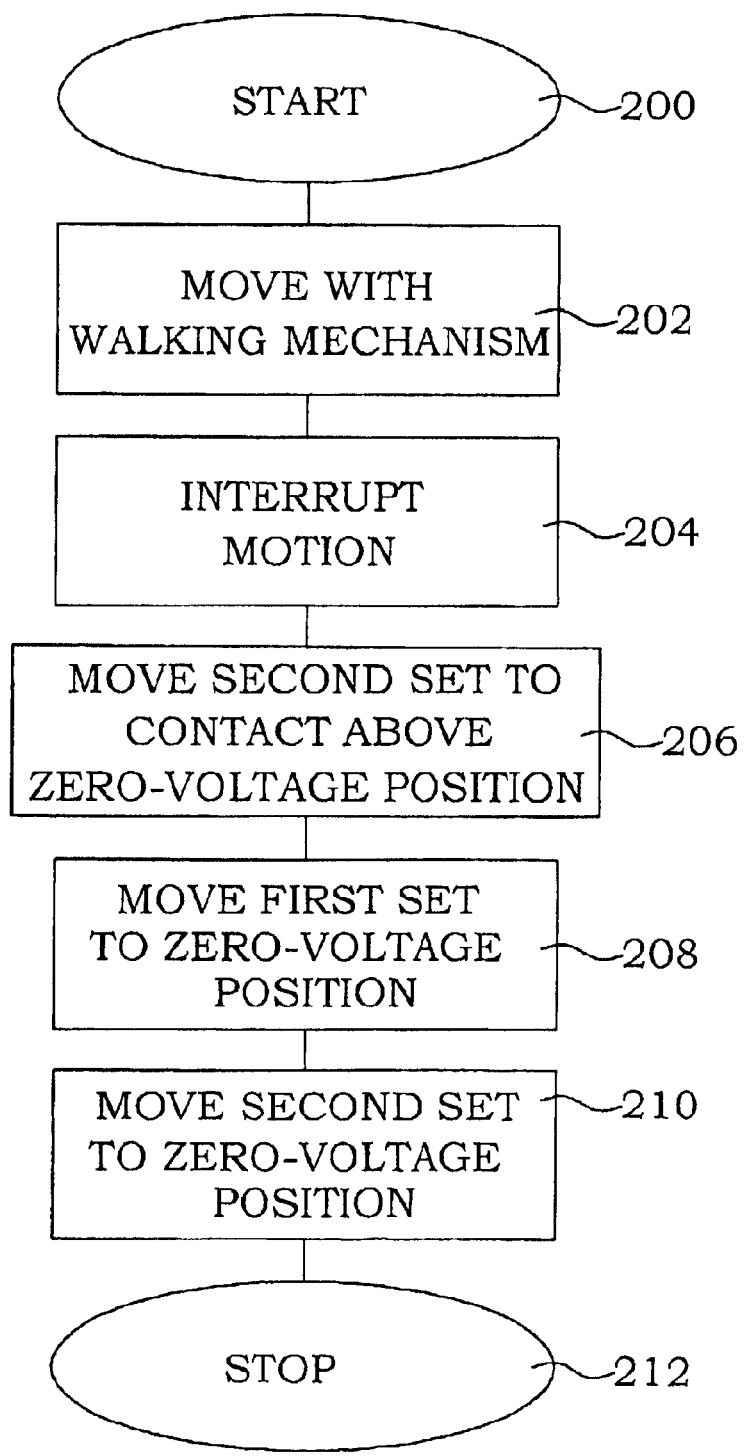
FIG. 9 is a flow diagram representing an embodiment of a parking procedure according to the present invention.

A flow diagram corresponding to the procedure described above is illustrated in FIG. 9. The procedure starts in step 200. In step 202, the moving object is moved according to a walking mechanism. In step 204, the motion is interrupted, holding the moving object at a predetermined position in the main displacement direction. The drive element sets are moved in step 206–210, one at a time, to a respective voltage-free parking position. These parking movements are performed in a direction substantially perpendicular to the main displacement direction when being in contact with the moving object. The procedure in ended in step 212.

The first set of drive elements is here assumed to be in mechanical contact with the moving object. In step 206, a second set of drive elements is moved to a retaining position on a line through the final voltage-free parking position that is perpendicular to the main displacement direction. In step 208, the first set of drive elements is brought to the voltage-free parking position. In step 210, the second set of drive elements is moved perpendicular to the main displacement direction to the voltage-free parking position.

Fine tuning of the position of the moving object can be made within the stroke length of one full step by the following two alternative methods. In the first method, the drive voltage on one set of drive elements is adjusted to a neutral point, e.g. point 74 in FIG. 8. Thereby, the other set of drive elements can use its full stroke, i.e. the full width of the rhombic area, for fine positioning of the moving object without interference of the other set of drive elements.

Alternatively, according to a second method, all elements will be controlled by the same set of drive voltages in the fine tune position. Thereby, all drive elements will move in the same manner. This method is advantageous under high load conditions when a high stiffness is needed. The two methods are valuable when a parking procedure have been made and fine positioning is needed due to e.g. thermal drift or aging in a mechanical system. If the need for fine tuning exceed the stroke length, a parking procedure can be made and the elements can start over to fine tune the center position of the stroke. In this way, fine tuning can be made over an indefinite distance with a high resolution.

When designing micromotor systems with very high positioning accuracy, the above control procedures are of significant importance. However, also the design of the actual hardware, driven by such control procedures, is of crucial importance.

Figure 10A:
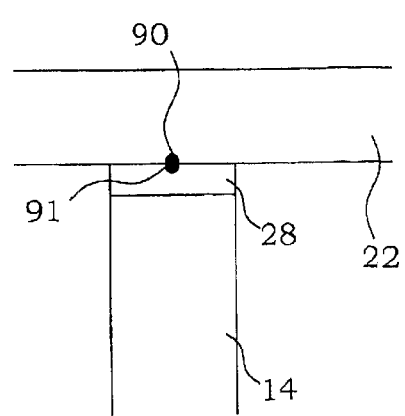
FIGS. 10a–b illustrate the effect of tilting drive elements relative to an object to move.
Figure 10B:
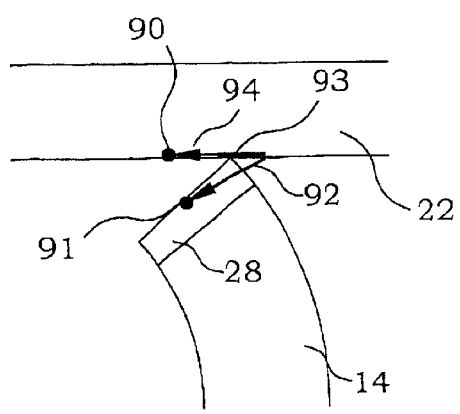

FIGS. 10a–b illustrates a drive element actuating on a moving object. All motions of the actuator are exaggerated enormously in these figures in order to visualize the effects of interest. The actuator is in FIG. 10a in a straight condition. The central point 91 of the contacting portion 28 is in contact with a reference point 90 of the moving object 22. When bending to the left, as illustrated in FIG. 10b, the central point of the contacting portion 28 is moved according a certain vector 92. However, during this motion, the contact point between the drive element 14 and the moving object 22 shifts sidewards, and the right corner 93 of the contact portion 28 on top of the drive element 14 is now in contact with the moving object 22. The reference point 90 of the moving object 22 is also moved, but according to a different vector 94. The motion of the contacting portion 28 can be fine controlled by controlling the voltages of the drive element 14. However, the actual motion of the moving object 22 is not controllable in the same manner. Moreover, the change of contacting points also leads to increased wear.

According to preferred embodiments according to the present invention, drive elements in motors based on the walking mechanism are provided with contacting portions which have an extension in the main displacement direction that is considerably smaller than the dimension of the active parts of the drive elements themselves in the same direction. Two such embodiments are illustrated in FIGS. 11a–b. In FIG. 11a, the contacting portion 28 is formed with a triangular cross-section. The slopes of the upper surfaces 15 are preferably steeper than the maximum tilting angle of the drive element 14. In such a way, the contact between the moving object 22 and the drive element 14 will always occur at the center 91. However, in certain applications, there is need for a larger contacting area between the drive element and the moving object. This may e.g. be the case when considerable force is needed. The contact portion 28 of FIG. 11b can then be selected. A ridge 17 is here formed on top of the drive element 14, which reduces the extent in the main displacement direction, but still can accept a higher load. The width of the ridge can be adjusted as a trade-off between position accuracy and the force that can be transferred between the drive element 14 and the moving object 22.

In another preferred embodiment according to the present invention, drive elements in motors based on the walking mechanism have a shape alteration that preserves the direction of the contacting portion. In FIGS. 12a–b, a drive element is illustrated, which always have its contacting portion directed in the same direction, irregardless of the shape alterations of the drive element. The drive element is here built up by two bimorph sections 95, 96, connected in series, i.e. essentially perpendicular to the bending direction. The lower 96 and upper 95 bimorph sections are provided with exciting voltages in an opposite manner, which means that when the lower bimorph 96 presents a bending to the left, the upper bimorph 95 bends to the right, as seen in FIG. 12b. An S-shaped drive element is thus formed for every bending situation (except for when the element is completely straight, as in FIG. 12a). In such a way, the contacting portion 28 is always kept essentially parallel with the moving object 22, and the precision and wear problems are significantly reduced. Double bimorph actuators have earlier been used, see e.g. U.S. Pat. No. 5,089,740. However, double bimorph actuators directly contacting the moving object 22 perpendicularly have not been used before.

Figure 13A:
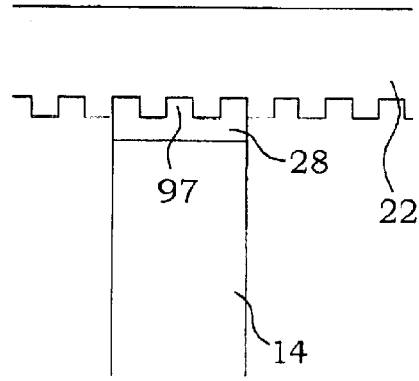
FIGS. 13a–c schematically illustrate teeth structures of drive elements and objects to move according to the present invention.
Figure 13B:
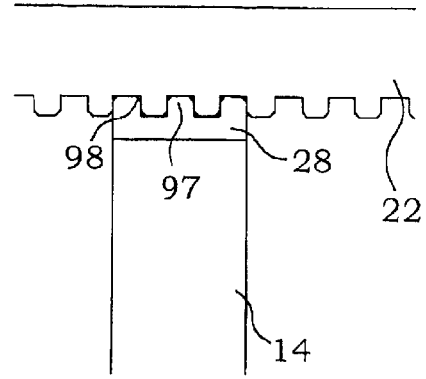
Figure 13C:
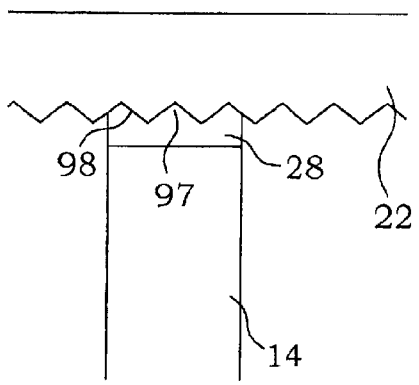

Achieving controlled step length with a high drive load is difficult, since relative motion between drive elements and moving object may occur. One solution to this problem is to have teeth on both the moving object and the contacting portion of the drive element. The actuating portion is thus provided with geometrical structures having surfaces being inclined relative to the main displacement direction. Furthermore, the object has corresponding geometrical structures being complementary to the geometrical structures of the contacting portion. The teeth structures will increase the coefficient of friction considerably, somewhat depending on geometry. In order to achieve as high coefficient of friction as possible, the teeth 97 should ideally have straight walls. Such structures are schematically illustrated in FIG. 13a. To allow for variations in actual step length or smaller tilting angels, the upper part of the teeth need to have some flank 98. One example is given in FIG. 13b. The flank may even be extended down to the bottom looking like a saw tooth surface, as in FIG. 13c. It is understood by anyone skilled in the art that other types of geometries are possible as well.

Since the spacing between the ridges or geometrical teeth needs to be in the order of a few microns, there are great demands on assembly accuracy both in height and laterally. The proper height accuracy is achieved by lapping the contacting portions of the drive elements before assembly. The lateral positioning accuracy is achieved by pressing a contacting portion with ridges or other structures that extends over the whole drive unit against the moving object and in that position glue it to the drive elements. After the glue is settled, the contacting portions can be released from each other by e.g. dicing.

Fabrication of the ridges or other tooth structures can be fabricated with prior art techniques such as lithography in combination with etching or high precision fine machining. For cost reduction, a master may be produced with techniques used for production of compact discs (CD). The master is fabricated by electroplating a pattern formed by techniques common for microelectronic fabrication. The master is then used in an injection-molding machine where suitable materials can be incorporated. Materials that can be used for production of teeth-shaped geometries are e.g. polymers, reinforced polymers, metals or ceramics.

Other advantages with teeth structures are that an absolute positioning can be achieved. The accuracy depends on the spacing between the ridges, i.e. narrower spacing allows for a higher positioning accuracy.

The use of teeth structures is somewhat limited when using drive elements such as shown in FIGS. 11a–b, since the reduced extension in the drive direction makes it difficult to apply multiple teethed structures. However, the geometrical structures of the contacting portions of FIGS. 11a–b will by themselves give rise to a similar effect, since straight or sloping surfaces are provided at the contacting portion. These surfaces can thus be used for gripping into geometrical structures of the object to be moved, and the geometrical shapes of the contacting portions can thus be considered having a geometrical structure with one tooth. It should, however, be noted that it might be possible to fabricate multiple teeth structures for use with the drive element shown in FIGS. 11a–b if the teeth surface is curved with a radius that follows the motion for the drive element.

However, using the design of the drive elements based on double bimorphs, discussed further above, teeth structures are easily incorporated in the contacting portions. In fact, the use of teeth combined with the S-bending of the double bimorphs is very useful indeed, since the contacting portions are kept parallel to the moving object surface all the time. The margins for tilting angels provided by the flanks of the teeth may be reduced and an even more accurate positioning can thus be achieved.

Figure 14A:
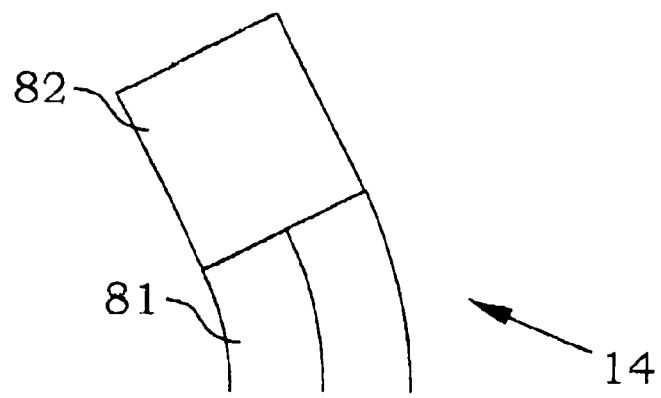
FIGS. 14a–b schematically illustrate drive element geometries enhancing the step size.

In some cases, e.g. for fine tuning and the case when teeth structures are used, it might be an advantage to have a large step size. In the case of fine tuning, an increased step size gives a larger tuning range. For use of teeth structures, an increased step size reduces demands on resolution when fabricating these structures, which in turn might reduce fabrication costs. Increased step size actuators can be made in several ways but it would also be an advantage if the volume of active material could be kept as low as possible, since the current consumption could be kept low during activation. One solution is to use as little active material that is needed to run the motors efficiently. Increased step length can, as illustrated in FIG. 14a, then be achieved by using a lever portion 82 on top of the active material 81 of a drive element 14. The lever portion 82 material can be the same material as the active material 81, then without electrodes, or some other material. In many cases a material that gives a stiff actuator is preferred. Since the length of the actuator is increased if a lever design is used, the stiffness will normally decrease, but with proper design, this problem may be solved. Alumina is preferably used, since in that case the contact surface geometry can be integrated directly in the lever portion 82.

If a high control accuracy of the height is needed, the lever portion 82 on top of the drive element 14 may be made of active material and provided with electrodes. In such a manner, the height of the lever portion 82 can be fine controlled independently of the rest of the drive element 14.

Figure 14B:
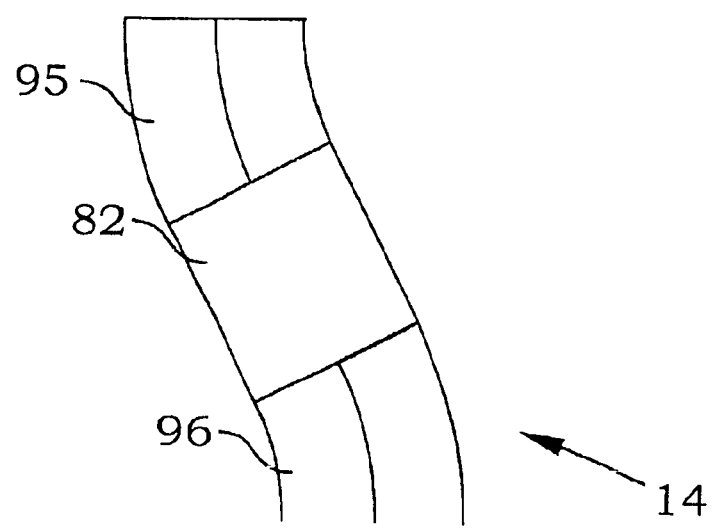

In case a double bimorph drive element is used, an embodiment of a similar solution is illustrated in FIG. 14b. Here the drive element 14 has a lower 96 and upper 95 bimorph section interconnected by a lever portion 83. The parallelity of the actuating surface is still maintained, but the stroke in the main displacement direction is increased. In the same manner as above, if a high control accuracy of height is needed, the lever portion 83 may be an active portion, possible to control from outside.

Figure 15:
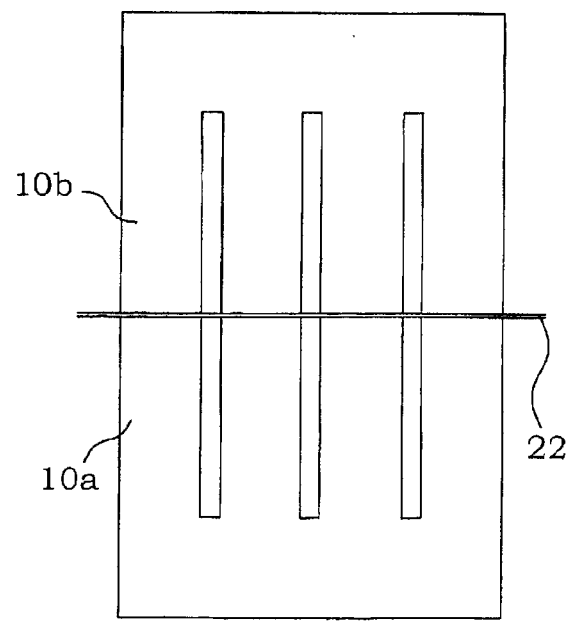
FIG. 15 illustrates a motor design according to an embodiment of the present invention, which allows for low-mass objects to be moved.

In many applications, there is a wish to decrease the mass of the moving object to be moved. This mass is associated e.g. with the vibrations in the drive direction. The moving object may therefore be made thinner. However, severe problems occur when the elastic bending of the moving object becomes of the same order of magnitude as the lifting capacity of the drive elements. The moving object becomes in other words too soft and flexible for allowing a walking mechanism. A solution of this, which allows for extremely low-mass moving objects is presented in FIG. 15. The moving object 22 is here manufactured plane-parallel with contacting portions on both sides of the moving object. Two essentially identical stator units 10a, 10b are positioned and pressed against the moving object 22 from opposite sides. If the operation of the stator units 10a, 10b is coordinated, both stator units 10a, 10b perform exact the same procedure, but inverted. This results in that the moving object 22 becomes clamped between drive elements of the two stator units 10a, 10b, and essentially no bending of the moving object perpendicular to the main displacement direction occurs. The moving object 22 may therefore be manufactured extremely thin, which means that the mass may be reduced to a fraction of what is needed with a one-side actuating stator.

It will be understood by those skilled in the art that various modifications and changes may be made to the present invention without departure from the scope thereof, which is defined by the appended claims.

What is claimed is:

1. Method for driving an electromechanical motor, having a stator actuating on an object to be moved in a main direction by drive elements, comprising the steps of:
   providing a first set of voltage signals to a first set of said drive elements, said first set of voltage signals comprising at least one voltage signal;
   providing a second set of voltage signals to a second set of said drive elements, said second set of voltage signals comprising at least one voltage signal;
   controlling said first set of voltage signals to cause contact portions of said first set of said drive elements to move along a first trajectory;
   controlling said second set of voltage signals to cause contact portions of said second set of said drive elements to move along a second trajectory;
   said first and second trajectories being arranged for causing a motion of said moving object relative to said stator by means of repetitions of small steps, ensuring a mechanical contact between said stator and said moving object at every instant;
   applying a normal force between said stator and said object;
   said normal force having a magnitude sufficient for causing an elastic deformation of said stator being at least in the same order of magnitude as height uncertainties of said stator perpendicular to said main displacement direction of said moving object.

2. Method according to claim 1, wherein said repetition of small steps has a driving frequency of the same order of magnitude as $f_r$, $f_r$ being a resonance frequency of said stator and moving object arrangement.

3. Method according to claim 2, wherein said repetition of small steps has a driving frequency above 0.3 $f_r$.

4. Method for driving an electromechanical motor, having a stator actuating on an object to be moved in a main direction by drive elements, comprising the steps of:
   providing a first set of voltage signals to a first set of said drive elements, said first set of voltage signals comprising at least one voltage signal;
   providing a second set of voltage signals to a second set of said drive elements, said second set of voltage signals comprising at least one voltage signal;
   controlling said first set of voltage signals to cause contact portions of said first set of said drive elements to move along a first trajectory;
   controlling said second set of voltage signals to cause contact portions of said second set of said drive elements to move along a second trajectory;
   said first and second trajectories being arranged for causing a motion of said moving object relative to said stator by means of repetitions of small steps, ensuring a mechanical contact between said stator and said moving object at every instant;
   said first and second trajectories having continuous derivatives in space at all points;
   a varying a velocity of said contact portions along respective trajectory, whereby an average velocity during periods when said contact portions are in mechanical contact with said moving object is lower than an average velocity during periods when said contact portions are free from mechanical contact.

5. Method according to claim 4, further comprising the step of controlling said first and second sets of voltage signals to impose a significant velocity component in said main direction during periods when said contact portions come into said mechanical contact with said moving object or release said non-sliding mechanical contact.

6. Method according to claim 4, wherein said first and second trajectories are ellipses, and said first and second sets of voltage signals comprise sinusoidal signals having an argument being non-linear with respect of time.

7. Method according to claim 6, wherein said sinusoidal signals are of the type:

$$\sin(C(\omega t)\omega t),$$

where $C(\omega t)$ is a non-constant function.

8. Method according to claim 7, wherein $C(\omega t)$ is a piecewise function giving constant velocity in the main displacement direction.

9. Method according to claim 4, said step of varying said velocity in turn comprises the step of moving said contact portions with piecewise constant velocity during said periods when said contact portions are in mechanical contact with said moving object, whereby a component in said main direction of said piecewise constant velocity is kept essentially constant during substantially the entire of said periods when said contact portions are in mechanical contact with said moving object.

10. Method for driving an electromechanical motor, having a stator actuating on an object to be moved in a main direction by drive elements, comprising the steps of:
   providing a first set of voltage signals to a first set of said drive elements, said first set of voltage signals comprising at least one voltage signal;
   providing a second set of voltage signals to a second set of said drive elements, said second set of voltage signals comprising at least one voltage signal;
   controlling said first set of voltage signals to cause contact portions of said first set of said drive elements to move along a first trajectory;
   controlling said second set of voltage signals to cause contact portions of said second set of said drive elements to move along a second trajectory;
   said first and second trajectories being arranged for causing a motion of said moving object relative to said stator by means of repetitions of small steps, ensuring a mechanical contact between said stator and said moving object at every instant;

parking said moving object relative to said stator, in turn comprising the steps of:
  interrupting said first set of voltage signals by retaining constant voltages on said first set of said drive elements, said first set of said drive elements being in mechanical contact with said moving object;
  moving said second set of said drive elements into mechanical contact with said moving object at a retaining position;
  moving said first set of said drive elements into a first parking position being defined as a position where zero voltages are applied to said first set of said drive elements;
  displacing said second set of drive elements from said retaining position into a second parking position being defined as a position where zero voltages are applied to said second set of said drive elements;
  said displacing being substantially perpendicular to a main displacement direction of said moving object.

11. Method according to claim 10, wherein said step of moving said second set of said drive elements in turn comprises the steps of:
  moving said second set of said drive elements without mechanical contacting said moving object to a grip preparing position, and
  moving said second set of said drive elements from said grip preparing position to said retaining position substantially perpendicular to said main displacement direction of said moving object.

12. Method according to claim 10, wherein said step of moving said first set of said drive elements in turn comprises the steps of:
  moving said first set of said drive elements substantially perpendicular to said main displacement direction of said object to a release position where no mechanical contact with said moving object remains, and
  moving said first set of said drive elements from said release position to said first parking position without mechanical contacting said moving object.

13. Device for driving an electromechanical motor, having a stator actuating on an object to be moved in a main direction by drive elements, comprising:
  first voltage signal providing means having connections intended for a first set of said drive elements;
  second voltage signal providing means having connections intended for a second set of said drive elements;
  first control means for causing said first voltage signal providing means to provide a first set of voltage signals, causing contact portions of said first set of said drive elements to move along a first trajectory;
  second control means for causing said second voltage signal providing means to provide a second set of voltage signals, causing contact portions of said second set of said drive elements to move along a second trajectory;
  said first and second trajectories being arranged for causing a motion of said moving object relative to said stator by means of repetitions of small steps, ensuring a mechanical contact between said stator and said moving object at every instant;
  said first and second trajectories having continuous derivatives in space at all points;
  means for varying a velocity of said actuating portions along respective trajectory, whereby an average velocity during periods when said contact portions are in mechanical contact with said moving object is lower than an average velocity during periods when said contact portions are free from mechanical contact.

14. Device according to claim 13, further comprising means for controlling said first and second sets of voltage signals to impose a significant velocity component in said main direction during periods when said contact portions come into said mechanical contact with said moving object or release said mechanical contact.

15. Device according to claim 13, wherein said first and second trajectories are ellipses, and said first and second sets of voltage signals comprise sinusoidal signals having an argument being non-linear with respect to time.

16. Device according to claim 15, wherein said sinusoidal signals are of the type:

$$\sin(C(\omega t)\omega t),$$

where $C(\omega t)$ is a non-constant function.

17. Device according to claim 16, wherein $C(\omega t)$ is a piecewise constant function.

18. Device according to claim 13, said means for varying said velocity in turn comprises means for moving said contact portions with piecewise constant velocity during said periods when said contact portions are in mechanical contact with said moving object, whereby a component in said main direction of said piecewise constant velocity is kept essentially constant during substantially the entire of said periods when said contact portions are in mechanical contact with said moving object.

19. Piezoelectric motor, comprising:
  a stator with drive elements;
  an object to be moved in a main direction by actuation of said drive elements;
  driving device, in turn comprising:
    first voltage signal providing means connected to a first set of said drive elements;
    second voltage signal providing means connected to a second set of said drive elements;
    first control means for causing said first voltage signal providing means to provide a first set of voltage signals, causing contact portions of said first set of said drive elements to move along a first trajectory;
    second control means for causing said second voltage signal providing means to provide a second set of voltage signals, causing contact portions of said second set of said drive elements to move along a second trajectory;
    said first and second trajectories being arranged for causing a motion of said moving object relative to said stator by means of repetitions of small steps, ensuring a mechanical contact between said stator and said moving object at every instant;
  said electromechanical motor further comprising:
  means for applying a normal force between said stator and said moving object;
  said normal force having a magnitude sufficient for causing an elastic deformation of said stator being at least in the same order of magnitude as height uncertainties of said contact portions perpendicular to said main displacement direction of said moving object.

20. Electromechanical motor according to claim 19, wherein said repetition of small steps has a driving frequency of the same order of magnitude as $f_r$, $f_r$ being a resonance frequency of said stator and moving object arrangement.

21. Electromechanical motor according to claim 20, wherein said repetition of small steps has a driving frequency above $0.3\, f_r$.

22. Electromechanical motor according to claim 19, wherein at least one of said contact portions has an extension in said main displacement direction that is significantly smaller than an average width of corresponding driving element in said main displacement direction.

23. Electromechanical motor according to claim 19, wherein at least one of said driving elements comprises two bimorph sections connected end to end, said bimorph sections being supplied with opposite voltage signals, whereby said at least one of said driving elements assumes an s-shape when activated.

24. Electromechanical motor according to claim 23, wherein at least one of said contact portions of said at least one of said driving elements is provided with first geometrical structures having surfaces being inclined relative to said main displacement direction, and wherein said moving object has second geometrical structures being complementary to said first geometrical structures.

25. Electromechanical motor according to claim 24, wherein said contact portions are provided with a toothed surface with a curvature radius following the motion of a respective drive element.

26. Electromechanical motor according to claim 19, wherein said moving object has a first portion on which said drive elements actuate, a second portion, and a connection portion connecting said first and second portions, said connection portion comprising a non-rigid connection.

27. Electromechanical motor according to claim 26, wherein said non-rigid connection comprises a spring.

28. Electromechanical motor according to claim 26, wherein said non-rigid connection further comprises a damping component.

29. Electromechanical motor according to claim 19, wherein said stator comprises a monolithic block comprising at least two of said drive elements connected by a passive portion, said passive portion comprising conduction paths connected to electrodes of said at least two of said drive elements, whereby electrodes can be contacted from the opposite side of said monolithic block.

30. Electromechanical motor according to claim 19, wherein said stator comprises at least one pair of sets of said drive elements, actuating on said moving object on opposite sides.

* * * * *